3,842,029
SYNTHETIC RESIN COMPOSITIONS
Kunio Saito, Yokohama, Tatsuo Ishii, Suita, and Shigetoshi Seta, Nobeoka, Japan, assignors to Asahi Kasei Kogyo Kabushiki Kaisha, Osaka, Japan
Filed Feb. 16, 1973, Ser. No. 333,292
Claims priority, application Japan, Feb. 29, 1972, 47/20,136
Int. Cl. C08g 51/04
U.S. Cl. 260—37 N                4 Claims

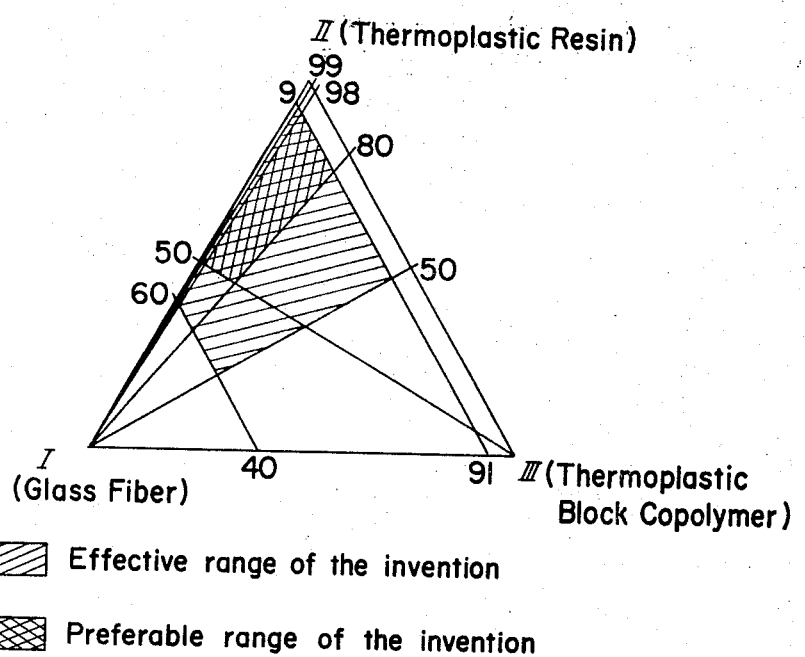

ABSTRACT OF THE DISCLOSURE

Improved synthetic resin compositions containing glass fiber are provided. The compositions comprise glass fiber; one or more of polyamide resin, polyoxymethylene resin, polycarbonate resin, thermoplastic polyester resin, polysulfone resin, polyphenylene oxide resin and the modified resin thereof; and conjugated diolefin-monovinyl aromatic hydrocarbon thermoplastic block copolymer. The compositions have superior noise resistant, skid resistant and impact resistant properties.

BACKGROUND OF THE INVENTION

Glass fiber-reinforced synthetic resin compositions are well known and now widely commercialized throughout the world. For example, compositions containing polyamide resin, polyoxymethylene resin, polycarbonate resin, polyester resin, or the like, containing 10–50 parts of glass fiber are widely used. The addition of continuous filament or chopped strands of glass fiber remarkably enhances rigidity, tensile strength, modulus of elasticity, thermo-resistance, impact resistance and other mechanical properties. Such addition appears to be almost indispensable, with so-called engineering resins such as those mentioned above, especially when they are to be employed in applications requiring improved mechanical, thermoresistant and like properties. The relative mechanical, thermo-resistant and other properties of glass fiber-reinforced polyamide resin and non-glass-fiber-reinforced polyamide resin are summarized in the Table 1. As shown in the Table, glass fiber reinforced polyamides have almost entirely different properties, compared to non-glass fiber-reinforced polyamides. However, such glass fiber reinforced-synthetic resin compositions, while remarkably superior still are not completely satisfactory especially when used for mechanical parts.

One problem is noise. As mentioned above, glass fiber-reinforced synthetic resin compositions, have superior mechanical properties when used for driving parts such as gears etc., damping parts such as brake shoes and wheels; bearings; and other mechanical parts requiring superior mechanical, thermo-resistant, and durability properties. However, their high rigidity gives rise to undesirable metallic noises and creaking sounds, when these parts rub and hit against each other and adjacent metallic parts. The noise is injurious to environmental sanitation. This problem has not yet been solved.

The second problem is skid resistance. For use in damping and similar parts, skid resistance and other mechanical properties including rigidity are simultaneously required. However, these two properties are mutually exclusive. Accordingly, in practice, compromise solutions which emphasize and select one property at the expense of the other have been accepted.

The third problem is impact resistance. Although the glass fiber-reinforced synthetic resin compositions do have high impact resistance, still higher impact resistance and together with fatigue resistance are often needed in special high stress application.

The present invention substantially alleviates the problems aforesaid while substantially retaining other distinctive features of glass fiber-reinforced resin compositions.

BRIEF SUMMARY OF THE INVENTION

The compositions according to the present invention comprise:
(I) Glass fiber;
(II) At least one compound selected from the group consisting of polyamide, polyoxymethylene, polycarbonate, thermoplastic polyester, polysulfone and polyphenylene oxide resins; and
(III) Conjugated diolefin-mono vinyl aromatic hydrocarbon thermoplastic block copolymers having the general formula $$(B-S)_n,$$
$$(B-S)_n-B$$
or
$$(S-B)_{n-1}-S$$

wherein,

B is substantially conjugated diolefin polymer block,
S is mono-vinyl aromatic hydrocarbon block, and
$n$ is a whole number of from 2 to 5,
wherein the amount of (I) is 10–150 weight parts (hereinafter referred as parts) preferably not less than 10 parts based on 100 parts of the mixture of (II) and (III), the amount of the (I) being not more than 100 parts based on 100 parts of (II), and
100 parts of the mixture of (II) and (III) consisting of 99–50, preferably 98–80 parts of (II) and 1–50, preferably 2–20 parts of (III).

BRIEF DESCRIPTION OF THE DRAWING

The figure shows the effective range of the composition according to the present invention.

DETAILED DESCRIPTION OF THE INVENTION

For material (I) according to the invention, glass fibers of the type normally available for resin blends and having a diameter of 2–20$\mu$ and a length of 50–20,000$\mu$, or glass spheres with the diameter of 6–60$\mu$ can be employed. Any of the previously known and effective pretreatment and blending methods can be employed for the present invention.

For the material (II) according to the invention, any of aforesaid synthetic resins can be used. Typical known polyamide resins which may be employed include polycaprolactam (nylon 6), polyhexamethyleneadipamide (nylon 66), poly-$\omega$-aminoenathic acid (nylon 7), polyhexamethylenesebacamide (nylon 610), polyamides prepared from hexamethylene diamine and 1,10-dicarboxy decane, (nylon 612), poly-$\omega$-aminoundecanoic acid (nylon 11) and polylauryl lactam (nylon 12). For polyoxymethylene resins, known homopolymers of formalin and copolymers with ethylene oxide, 1,3-dioxolane are suitable. For polycarbonate resins, known polymers of bisphenol A and phosgene are suitable. Polyester resins include known thermoplastic polyester resins, for example polyethylene glycol-terephthalates or polybutane diol-terephthalates. Polyphenylene oxide resins include the homopolymer and other known resin compositions for example blend composition with polystyrene.

Polysulfone resins include polymers of bisphenol A sodium salt and 4,4'-dichloro phenyl sulfone.

Other materials, for example acrylonitrile-styrene copolymers or acrylonitrile-butadiene-styrene copolymers are excluded from the category of the material (II) according to the invention, due to their inferior strength or other mechanical properties.

For the material (III) used for the present invention, conjugated diolefin-mono vinyl aromatic hydrocarbon thermoplastic block copolymers having the general formula $$(B-S)_n,$$
$$(B-S)_n-B$$

or $$(S-B)_{n-1}-S$$

wherein

B is substantially conjugated diolefin polymer block,
S is mono-vinyl aromatic hydrocarbon polymer block, and
n is a whole number of from 2 to 5.

are suitable.

Generally, thermoplastic block copolymers employed for the present invention can be prepared according to the following method.

The monomer mixture of conjugated diolefin and mono-vinyl aromatic hydrocarbon are copolymerized in hydrocarbon solvent using lithium hydrocarbon as a catalyst, and to the resultant active copolymer, monomer mixture of fresh diolefin and mono-vinyl aromatic hydrocarbon are added and polymerized. This procedure is followed until the desired $n$ is obtained. In order to obtain $$(S-B)_{n-1}-S$$

type copolymer, mono-vinyl aromatic hydrocarbon alone instead of the monomer mixture is added, after $(S-B)_{n-1}$ having the prescribed number of $n$ is obtained.

For the conjugated diolefin, single compounds or mixtures of at least two compounds, of 1,3-butadiene, isoprene, 1,3-pentadiene, 2,3-dimethyl butadiene, etc. are used. For the mono-vinyl aromatic hydrocarbon, one or more of styrene, vinyl toluene, vinyl xylene, ethyl styrene, isopropyl styrene, ethyl vinyl toluene, tert-butyl styrene, vinyl naphthalene, etc. are used. For the combination of monomer mixtures of conjugated diolefin and mono-vinyl aromatic hydrocarbon, monomers having a high monomer reactivity ratio produce preferred thermoplastic block copolymers. Examples of preferred combinations are 1,3-butadiene and styrene, isoprene and styrene, 1,3-pentadiene and vinyl toluene, 1,3-pentadiene and vinyl naphthalene, etc. Best results are obtained when the molecular weight of the thermoplastic block copolymer is from 5,000 to 500,000, and the content of the mono-vinyl aromatic hydrocarbon are from 10 to 70 weight percent.

It is notable and advantageous that material (III) used in the present invention, can be granulated according to technique used for the known thermoplastic resin.

Generally, it is difficult to granulate polyisoprene, polybutadiene, butadiene-styrene and similar random copolymers because they tend to block. To overcome this difficulty and to blend these thermoplastic resins, roll mills, banbury mixers and the like are required. In these cases, the thermoplastic resins should possess relatively low softening point and good thermal stability.

In the present invention, the softening point of (II) or the mixture of (I) and (II) is high. However, since the thermal stability of (II) or the mixture of (I) and (II) is inferior in these high softening point ranges, it is practically impossible to blend (II) or the mixture of (I) and (II) with the afore-said material.

In order to attain the enhancement of rigidity, thermal stability and mechanical properties, in the present invention the composition ratio of (I) should be in the aforesaid range. In the range where the weight ratio of (I) to [(II)+(III)] is less than 10/100, the advantages of the invention can not be attained. On the other hand, when the ratio is more than 60/40, the melt viscosity is too high and molding becomes difficult. Further, with high rigidity there is increased brittleness, which makes the product unsuitable for practical use.

The desirable range of (II) and (III) are determined from the standpoint of the performance of the mechanical properties. If the amount of (III) is too small, the improvements of the invention are not completely attained. On the other hand, if the amount of (III) is too large, the superior mechanical properties which (II) originally possessed are lost. For example, a composition with weight ratio of (II): to (III) of 50:50 exhibit low rigidity and diminished toughness.

TABLE 1.—MECHANICAL PROPERTIES OF GLASS FIBER-REINFORCED POLYHEXAMETHYLENE ADIPAMIDE (NYLON 66)

| Testing items | Testing method | Unit | Nylon 66 GF 0% | Nylon 66 GF 33% |
|---|---|---|---|---|
| Specific gravity | ASTM D792 | | 1.14 | 1.38 |
| Tensile strength | ASTM D638 | Kg./cm.$^2$ | 830 | 1,850 |
| Elongation | ASTM D638 | Percent | 60 | 4.5 |
| Flexural strength | ASTM D790 | Kg./cm.$^2$ | 1,300 | 2,700 |
| Flexural elasticity | ASTM D790 | Kg./cm.$^2$ | 30,000 | 91,000 |
| Izod impact strength | ASTM D256 | Kg.-cm./cm. | 3.9 | 9.8 |
| Heat deflection temperature | ASTM D648 | °C | 60 | 248 |
| Rockwell hardness | ASTM D785 | | R 118 | M 101 |

NOTE.—GF is abbreviation of Glass Fiber.

The present invention is characterized in that glass fiber-reinforced synthetic resin further comprises thermoplastic block copolymer consisting of conjugated diolefin and mono-vinyl aromatic hydrocarbon.

According to the present invention, all the three requirements needed for glass fiber-reinforced synthetic resin, namely noise prevention, enhancement of skid resistance and improvement of impact resistance, are entirely solved. Heretofore, no material has simultaneously provided these three requirements. Therefore the replacement of mechanical parts with resin parts was retarded, and when resin was used for the mechanical parts large equipment for noise prevention was necessitated. The present invention has greatly extended the possible uses and markets for glass fiber reinforced synthetic resin compositions.

The compositions provided according to the present invention are suitable not only for the known applications for conventional glass fiber-filled compositions but also, due to their superior qualities to high stress applications, such as bearings, driving apparatus, damping apparatus, etc. In addition, the compositions according to the present invention are remarkably effective for other extensive uses, for example for the bushing of spinning, knitting and weaving machines, cams, gear wheels and shuttles; automobile parts such as radiator fans, headlights and brake levers; bushings for electric telecommunication apparatus; housings for electric apparatus; frames and for other miscellaneous goods. The following non-limiting examples are given by way of illustration only:

EXAMPLE 1

A styrene butadiene thermoplastic block copolymers were synthesized as described below and used to form the compositions shown in Table 2. Noise prevention, slip resistance enhancement, and impact resistance enhancement of the compositions were tested.

To 15 weight percent n-hexane solution containing 330 g. of a monomer mixture of 1,3-butadiene and styrene with the weight ratio of 1,3-butadiene to styrene of 40/60, 12.5 mm. mol of butyl lithium as active lithium were added and polymerization was carried out at 60° C.

for 3 hours. To the resultant active copolymer solution, 15 weight percent of n-hexane solution containing 670 g. of the monomer mixture of 1,3-butadiene and styrene with the weight ratio of 1,3-butadiene to styrene of 70/30 were added and the mixture heated at 70° C. for 4 hours and then at 80° C. for 1 hour were to copolymerize substantially all the added monomer mixture. Thereafter, 5 g. of 2,4-di-tert-butyl-p-cresol as a stabilizer were added, and the n-hexane solvent was removed by drying to obtain 100 g. of thermoplastic block copolymer. The copolymer contains 40 weight percent of styrene and consists of 4 blocks [butadiene] - [styrene] - [butadiene]-[styrene]. The melt flow index (ASTM D-1238 Condition G) was 11 (g./10 min.)

Using thus obtained thermoplastic block copolymer, three-component composition as shown in Table 2 containing glass fiber ($9\mu\varphi$ chopped strand) and polyhexamethyleneadipamide (nylon 66) were prepared and the physical properties were tested. Testing apparatus used for this example were skid resistance tester of Road Research Laboratories Co. (England) for skid resistance test, thrust journal type friction and wearing testing machine for testing the coefficient of friction, JIS C 1502-2966 directional noise meter for noise measurement which was conducted by measuring the sound during the measurement of the coefficient of friction, and Izod impact testing machine prescribed by ASTM D-256 for impact resistance.

ment, for a sound more than 95-100 db is considered loud and unpleasant.

EXAMPLE 2

Using the thermoplastic block copolymers obtained by methods similar to that described in Example 1, three-component compositions shown in Table 3, containing glass fiber ($9\mu\varphi$ chopped strand) and thermoplastic resin were prepared and the physical properties were tested.

TABLE 3

| Glass fiber (weight percent) | Thermoplastic resin (weight percent) | Thermoplastic block copolymer (weight percent) | Tensile strength (kg./cm.²) | Elongation (percent) | Izod impact strength (kg.·cm./cm.) | Skid resistance | The coefficient of friction | Noise (db) |
|---|---|---|---|---|---|---|---|---|
| 20 | Polyacetal (80) | 0 | 1,300 | 3.0 | 8.6 | 17 | 0.65 | 100 |
| 18.5 | Polyacdtal (73.3) | 8.2 | 1,050 | 3.5 | 13.1 | 30 | 0.51 | 91 |
| 30 | Polyethylene terephthalate (70) | 0 | 1,400 | 5.5 | 12.5 | 18 | 0.70 | 103 |
| 27.8 | Polyethylene terephthalate (65) | 7.2 | 1,200 | 5.7 | 17.3 | 32 | 0.53 | 92 |
| 20 | Modified polyphenylene oxide (80) | 0 | 1,020 | 5.0 | 12.7 | 18 | 0.68 | 101 |
| 18.5 | Modified polyphenylene oxide (73.3) | 8.2 | 830 | 5.5 | 19.8 | 33 | 0.52 | 90 |
| 30 | Polysulfone (70) | 0 | 1,150 | 2.0 | 10.0 | 16 | 0.71 | 102 |
| 27.8 | Polysulfone (65) | 7.2 | 970 | 3.0 | 15.3 | 30 | 0.54 | 91 |

As is clear from Table 3, the compositions according to the present invention have greatly improved and enhanced properties of noise prevention, skid resistance and impact strength.

What is claimed is:

1. An improved synthetic resin composition comprising:
   (I) 10-150 parts by weight based on 100 parts of the total amount of (II)+(III) of glass fiber,
   (II) 99-50 parts by weight based on 100 parts of the total amount of (II)+(III) of at least one polyamide resin selected from the group consisting of nylon 6, nylon 7, nylon 11, nylon 12, nylon 66, nylon 610 and nylon 612, and
   (III) 1-50 parts by weight based on 100 parts of the total amount of (II)+(III) of thermoplastic block copolymer of conjugated diolefin-monovinyl aro-

TABLE 2

| Ratio of the composition | | | Physical properties of the molded article | | | | | |
|---|---|---|---|---|---|---|---|---|
| Glass fiber (weight percent) | Nylon 66 (weight percent) | Thermoplastic block copolymer (weight percent) | Tensile strength (kg./cm.²) | Elongation (percent) | Izod impact strength (kg.·cm./cm.) | Skid resistance | The coefficient of friction | Noise (db) |
| 33.3 | 66.7 | 0 | 1,850 | 4.5 | 9.8 | 18 | 0.70 | 101 |
| 32.5 | 66.1 | 1.4 | 1,700 | 5.1 | 14.3 | 26 | 0.60 | 91 |
| 31.9 | 64.8 | 3.3 | 1,650 | 5.3 | 15.7 | 29 | 0.58 | 91 |
| 30.7 | 62.4 | 6.9 | 1,600 | 5.4 | 17.4 | 32 | 0.55 | 90 |
| 29.1 | 59.1 | 11.8 | 1,400 | 5.7 | 18.7 | 34 | 0.53 | 90 |
| 27.8 | 72.2 | 0 | 1,700 | 4.6 | 9.0 | 18 | 0.68 | 101 |
| 19.6 | 40.2 | 40.2 | 700 | 5.7 | 21.3 | 43 | 0.45 | 85 |
| 18.5 | 81.5 | 0 | 1,370 | 4.7 | 7.1 | 17 | 0.66 | 100 |
| 9.0 | 81.9 | 9.1 | 900 | 4.7 | 13.6 | 33 | 0.48 | 90 |
| 47.3 | 47.3 | 5.4 | 2,100 | 3.3 | 12.4 | 31 | 0.60 | 92 |

NOTE.—The number in the column of the skid resistance shows relative energy absorbed when the material skids. The larger the number, the higher the absorbed energy and the greater the resistance to skidding; the coefficient of friction was measured by testing sliding friction of each composition against steel. Surface pressure is 10 kg./cm.², and the sliding velocity is 1.2–36 cm./sec.

Table 2 clearly shows the remarkable improvement of the modified synthetic resins of the present invention in terms of noise prevention, skid resistance and impact resistance. The noise of the compositions of the present invention was lessened about 8-16 db, compared to the material without thermoplastic block copolymer. The fact that the noise of the present modified synthetic resin composition is not more than 92 db denotes great improvematic hydrocarbon having the general formula of $$(B-S)_n,$$
$$(B-S)_n-B$$

or $$(S-B)_n-1-S$$

wherein, B is substantially conjugated diolefin polymer block, S is monovinyl aromatic hydrocarbon block, and n is a whole number of from 2 to 5, the molecular weight of said block copolymer being from 5,000 to 500,000 and the content of said vinyl aromatic hydrocarbon being from 10 to 70 weight percent.

2. The improved synthetic resin composition according to claim 1 wherein (I) is glass fiber of at least one material selected from the group consisting of continuous filament, chopped strand and sphere.

3. The improved synthetic resin composition according to claim 2 wherein the amount of glass fiber is not weight of (II).

4. The improved synthetic resin composition according more than 100 parts by weight based on 100 parts by to claim 1 wherein the polyamide resin is nylon 66.

References Cited
UNITED STATES PATENTS

| | | | |
|---|---|---|---|
| 3,644,271 | 2/1972 | Tulley | 260—37 NX |
| 3,654,219 | 4/1972 | Boyer et al. | 260—37 NX |
| 3,702,877 | 11/1972 | Bonafiglia et al. | 260—857 D |

ALLAN LIEBERMAN, Primary Examiner

E. S. PARR, Assistant Examiner

U.S. Cl. X.R.

260—41 AG, 41.5 R, 857 D, 857 G